US008279874B1

(12) United States Patent
Lu et al.

(10) Patent No.: US 8,279,874 B1
(45) Date of Patent: Oct. 2, 2012

(54) SELF-CONFIGURING NETWORK

(75) Inventors: Zihong Lu, Cupertino, CA (US); Nick Suizo, San Jose, CA (US); Raj Nagarajan, Newark, CA (US); Anil Villait, Saratoga, CA (US); Wolfgang M. Lochner, Sunnyvale, CA (US); Jeff Ronne, Cupertino, CA (US); Sandra Yu, San Francisco, CA (US); Prabhat Tripathi, San Jose, CA (US); Suresh Ramamurthy, Santa Clara, CA (US); Raju Koganty, San Jose, CA (US); Allison Marks, Sunnyvale, CA (US); Yasar Khan, Sunnyvale, CA (US); Govind raj Desur, Cupertino, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 309 days.

(21) Appl. No.: 11/772,031

(22) Filed: Jun. 29, 2007
(Under 37 CFR 1.47)

Related U.S. Application Data

(63) Continuation-in-part of application No. 11/731,135, filed on Mar. 30, 2007.

(51) Int. Cl.
*H04L 12/28* (2006.01)
(52) U.S. Cl. .................................................. 370/395.2
(58) Field of Classification Search .......... 370/394–396, 370/395.2
See application file for complete search history.

(56) References Cited

U.S. PATENT DOCUMENTS

| 5,561,763 | A | 10/1996 | Eto et al. |
| 5,751,967 | A | 5/1998 | Raab et al. |
| 6,070,187 | A * | 5/2000 | Subramaniam et al. ....... 709/220 |
| 6,307,544 | B1 | 10/2001 | Harding |
| 6,456,306 | B1 * | 9/2002 | Chin et al. ..................... 715/810 |
| 6,678,248 | B1 | 1/2004 | Haddock et al. |
| 6,816,897 | B2 * | 11/2004 | McGuire ....................... 709/223 |
| 6,904,424 | B1 | 6/2005 | Gusler et al. |
| 7,380,025 | B1 * | 5/2008 | Riggins et al. .................... 710/8 |

(Continued)

FOREIGN PATENT DOCUMENTS

| WO | WO-0186906 | 11/2001 |
| WO | WO-2006133383 | 12/2006 |

OTHER PUBLICATIONS

Non-Final Office Action for U.S. Appl. No. 11/731,135, Mailed Oct. 26, 2009, 24 Pages.

(Continued)

*Primary Examiner* — Ayaz Sheikh
*Assistant Examiner* — Hai-Chang Hsiung
(74) *Attorney, Agent, or Firm* — Blakely, Sokoloff, Taylor & Zafman

(57) ABSTRACT

A self-configuring network comprises network devices that are automatically provisioned with appropriate network resources upon the occurrence of a network event. A profile containing one or more commands to provision a network device with appropriate network resources is deployed to selected connecting devices. The selected connecting devices are targeted for deployment based on the network device and/or port groups to which they belong as determined from a network management system. The profile is bound to the selected connecting devices and affected ports as well as the network events that will trigger execution of the profile on the devices where they are deployed. A graphical user interface and profile information database may be used to facilitate managing the profiles, targeted devices/ports and associated network events.

13 Claims, 18 Drawing Sheets

U.S. PATENT DOCUMENTS

| | | | |
|---|---|---|---|
| 2002/0009078 A1* | 1/2002 | Wilson et al. | 370/389 |
| 2002/0194407 A1 | 12/2002 | Kim | |
| 2003/0217148 A1 | 11/2003 | Mullen et al. | |
| 2003/0225893 A1 | 12/2003 | Roese et al. | |
| 2004/0003600 A1 | 1/2004 | Hawkins, Jr. et al. | |
| 2004/0073600 A1 | 4/2004 | Elo et al. | |
| 2004/0133634 A1 | 7/2004 | Luke et al. | |
| 2005/0163118 A1 | 7/2005 | Steindl | |
| 2005/0195949 A1 | 9/2005 | Frattura | |
| 2005/0204176 A1* | 9/2005 | Togawa | 713/320 |
| 2005/0264420 A1* | 12/2005 | Vogel et al. | 340/572.1 |
| 2005/0273851 A1* | 12/2005 | Raju Datla et al. | 726/14 |
| 2006/0133383 A1 | 6/2006 | Homer et al. | |
| 2006/0168203 A1* | 7/2006 | Levillain et al. | 709/224 |
| 2006/0187849 A1 | 8/2006 | Hamedi | |
| 2006/0236095 A1* | 10/2006 | Smith et al. | 713/153 |
| 2006/0274774 A1 | 12/2006 | Srinivasan et al. | |
| 2007/0038699 A1 | 2/2007 | Oikarinen et al. | |
| 2007/0064624 A1 | 3/2007 | Finn et al. | |
| 2008/0101240 A1 | 5/2008 | Rohilla et al. | |
| 2008/0147455 A1 | 6/2008 | Brunswig et al. | |
| 2008/0219184 A1 | 9/2008 | Fowler et al. | |
| 2011/0243133 A9 | 10/2011 | Villait et al. | |

OTHER PUBLICATIONS

Final Office Action for U.S. Appl. No. 11/731,135, Mailed Mar. 15, 2010, 25 Pages.

Non-Final Office Action for U.S. Appl. No. 11/731,135, Mailed Aug. 30, 2010, 26 pages.

Final Office Action for U.S. Appl. No. 11/731,135, Mailed Feb. 23, 2011, 23 pages.

International Search Report and Written Opinion from the International Searching Authority for International Application No. PCT/US06/22388, mailed Sep. 13, 2007, 12 pages.

"PCT International Preliminary Report on Patentability (Chapter I of the Patent Cooperation Treaty) for International Application No. PCT/US06/22388", (Dec. 11, 2007), Whole Document.

Davies, "RADIUS Protocol Security and Best Practices, Microsoft Windows 2000 Server, Microsoft Corporation, pp. I-iv and 1-12, Jan. 2002", I-iv and 1-12.

Rigney, et al., "Remote Authentication Dial in User Service (RADIUS), Network Working Group, pp. 1-71, Jun. 2000", 1-71.

Final Office Action for U.S. Appl. No. 11/147,143, dated Apr. 14, 2011, Whole Document.

Final Office Action for U.S. Appl. No. 11/147,143, dated Dec. 7, 2009, Whole Document.

Office Action for U.S. Appl. No. 11/147,143, dated Feb. 6, 2009, Whole Document.

Office Action for U.S. Appl. No. 11/147,143, dated Aug. 17, 2011, Whole Document.

"Office Action for U.S. Appl. No. 11/147,143, dated Aug. 31, 2010", Whole Document.

* cited by examiner

Network Profiles Managed Profiles Audit Log

EPICenter  File  Tools  Help

☐ New  📂 Open  💾 Save As  ↙ Import  🗑 Delete  ⚙ Test  ⟲ Deploy

Managed Profiles

Search: For:
All  🔍

Filter

Filtered Profiles

Showing 17 Profiles

| Profile Name | Profile Version | Date Modified |
|---|---|---|
| voip_script_generic | default | Apr 26, 2007 05:58 AM |
| voip_script_ad | default | Apr 26, 2007 05:58 AM |
| voip_script_802_1x | default | Apr 26, 2007 05:58 AM |
| avaya_8021x | TOI | Apr 26, 2007 06:19 AM |
| gen_8021x | TOI | Apr 26, 2007 06:19 AM |
| disable_ports | TOI | Apr 26, 2007 06:20 AM |
| enable_ports | TOI | Apr 26, 2007 06:20 AM |
| gen_lldp | TOI | Apr 26, 2007 06:21 AM |
| init_eaps | TOI | Apr 26, 2007 06:22 AM |
| init_qos | TOI | Apr 26, 2007 06:22 AM |
| init_snmp | TOI | Apr 26, 2007 06:23 AM |
| init_vlans | TOI | Apr 26, 2007 06:23 AM |
| printer_profile | TOI | Apr 26, 2007 06:32 AM |
| test_printer_profile | ver1 | Apr 26, 2007 06:30 AM |
| test_enable_ports | ver1 | Apr 26, 2007 06:34 AM |

Devices Deployed

Showing 1 Device

| Device Name -1 | IP Address -2 | Profile Name -3 | Profile State | Device Last Reached |
|---|---|---|---|---|
| SummitX450-... | 10.205.1.72 | test_disable_ports | Enabled | Apr 26, 2007 0 |

900

Deploy Profile voip_script_generic (default)

Which trigger events do you want?

Once the profile is deployed to one or more devices, these events trigger the profile to run.

Run profile at:
- ○ User request
- ○ Scheduled time:

At [03:32:12 PM ▲▼]   On [April 3, 2007 ▼]

Continue every: [_____ ▼] (optional)

- ● Other trigger events:

Showing 4 Events

| Choose | Trigger Event Name |
|---|---|
| ☑ | Device Detected (required) |
| ☑ | Device Undetected (required) |
| ☐ | User Authenticated |
| ☐ | User Unauthenticated |

[Cancel]  [Next >]

FIG. 11

Deploy Profile voip_script_generic (default)

Deploy to which device groups?
Choose to deploy to down, unreachable, or offline devices if you expect them to be accessible when you deploy. If they are still unreachable at the time of validation (at the end of this wizard), you will not be able to deploy them. Trigger events: Device Detected, Device Undetected

| Name | IP Address | Ability to Reach Device |
|---|---|---|
| ☐ Default | 10.205.1.122 | |
| ☐ SummitX450-24t | 10.205.1.72 | HTTP reachable |
| | 10.205.1.127 | |
| | 10.205.1.126 | |
| | 10.205.1.120 | |
| | 10.205.1.124 | |
| | 10.205.1.123 | |
| ☐ X450a-40t | 10.205.1.75 | HTTP reachable |
| ☐ X450a-40t | 10.205.1.74 | HTTP reachable |
| | 10.205.1.21 | |
| | 10.205.1.128 | |
| ☐⊗ BD-12804 | 10.205.10.5 | Down or HTTP unreachable |
| ☐⊗ SummitX450-24x | 10.205.12.5 | Down or HTTP unreachable |

[Select All] [Clear All]

(Grayed out devices are incompatible with Universal Port Manager either because they are ExtremeWare, or their EXOS is below version 12.0.)

[< Back] [Cancel]

Deploy Profile voip_script_generic (default)

Deploy to which ports?

Trigger events: Device Detected, Device Undetected

Trigger events: Device Detected, Device Undetected

Deploy to ports:

| Name | IP Address |
|---|---|
| * ☑ SummitX450... | 10.210.12.6 |
| * ☑ X450a-48t | 10.210.12.4 |
| * ☑ SummitX450... | 10.210.12.3 |
| * ☑ SummitX450... | 10.210.12.5 |

Selected ports:
Showing 4 Devices

| Name | IP Address | Ports |
|---|---|---|
| Summi... | 10.210.12.3 | 1-26 |
| Summi... | 10.210.12.6 | 1-26 |
| X450a... | 10.210.12.4 | 1-50 |
| Summi... | 10.210.12.5 | 1-26 |

[Select All] [Clear All]

[< Back] [Next >] [Cancel]

SELF-CONFIGURING NETWORK

CROSS-REFERENCE TO RELATED APPLICATIONS

This application is a continuation-in-part of co-pending U.S. patent application Ser. No. 11/731,135, entitled PORT MANAGEMENT SYSTEM, filed on Mar. 30, 2007, which is incorporated herein by reference.

TECHNICAL FIELD

The present invention relates to the field of computer networks and internetworking communications technologies. In particular, the present invention relates to network configuration and management.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2007, Extreme Networks, Inc., All Rights Reserved.

BACKGROUND

Enterprise networks typically accommodate a multitude of applications and services such as e-commerce, enterprise resource planning, private Intranets, supply-chain extranets and new Voice over Internet Protocol ("VoIP") and wireless infrastructure. In addition, increasing numbers of service providers and enterprises alike are consolidating their communications infrastructures into a single converged intelligent data network. Adding to the complexity, networks have come under an increasing number of malicious attacks that not only compromise the security of network resources, but also prevent access by legitimate users.

Over the years, proprietary network management systems ("NMSs") have been developed to help service providers and enterprises manage their communications infrastructures, such as the NMS sold under the trademark "EpiCenter" by Extreme Networks, Inc., of Santa Clara, Calif., the assignee of the present application. For example, EpiCenter provides network management tools to facilitate the management of the connection points in a network, such as the switches, hubs, and routers, collectively referred to as switches, as well as the end points in the network, such as computer workstations, wireless access points (AP), VoIP telephones, and application servers.

One example of the type of network management task that is often facilitated by an NMS is the task of controlling access to network resources. In a typical scenario, the NMS operates in conjunction with an authentication server, such as the Remote Authentication Dial-In User Service ("RADIUS") server, to provision a switch with the appropriate network resources based on the type of device and/or identity of the user that is attempting to gain access. Among other things, provisioning the switch with the appropriate network resources primarily involves deploying the proper configuration and policy data to the switch through which the device/user is connected to the network, and instructing the switch to configure the port in accordance with the deployed data.

In today's complex converged network environments that support both wired and wireless access to a variety of resources, including voice, video, and data, ensuring that the switch is properly provisioned can be burdensome. For example, in order to provision the switch with the correct network resources, quality of service, and security policy for successful voice operation, the switch must be instructed to configure a selected port to which a VoIP telephone is connected with the proper Link Layer Data Protocol (LLDP) parameters, Virtual Local Area Network (VLAN) name, port VLAN ID, power conservation mode, call server name, 802.1Q framing parameter, and Access Control List (ACL). Should the user/device subsequently access the network from a different location, the switch may need to be instructed to configure a different port, or, if the switch through which the user is connecting to the network changes, then the new switch may have to be separately provisioned.

Because there can be hundreds of switches in a network, each having numerous ports, provisioning them with the correct network resources is not only time-consuming, but also error-prone. Moreover, any given switch may use different LLDP parameters and/or other data values, and/or may need to be instructed differently, depending on whether the switch is a different model, or from a different vendor. In addition, should the type of end point device that is accessing the network change, such as the model and vendor of the VoIP telephone, the switch may again need to use different LLDP parameters and/or other data values. Moreover, once the user/device disconnects from the network, the previous switch port configuration needs to be restored in order to secure the network. The process starts all over again once the next device connects to the network, whether it is the same device or an altogether different device, such as a computer workstation.

In an effort to address some of these challenges, network architects of complex converged networks are turning to a new generation of intelligent switches equipped with operating systems that provide more advanced configuration and security capabilities than were previously available. For example, the switch operating system sold under the trademark "ExtremeXOS" by Extreme Networks, Inc., of Santa Clara, Calif., the assignee of the present application, provides Extreme's switches with advanced capabilities, including the ability to store configuration information that can be used to dynamically configure a port as needed in a non-disruptive manner.

Despite these advances, existing network management tools are inadequate to help network administrators to fully exploit the advanced configuration and security capabilities of today's intelligent switches. As a result, network administrators have avoided implementing ambitious and complex configurations that would ultimately help them to make their networks more robust and secure.

SUMMARY

Embodiments of the present invention include a method and system to build and manage a self-configuring network. The self-configuring network comprises network devices that are automatically provisioned with appropriate network resources upon the occurrence of a network event. The network devices include any connecting device through which access to a network resource may be controlled, such as a switch, router, or hub, collectively referred to herein as a switch for ease of reference. The network resources may include any device or service accessible on the network. The network event may include any network event that is related to any device or user connected to the network. As such, the events are typically related to end point devices, such as computer workstations, wireless access points (AP), VoIP telephones, and application servers. In some cases, however, the events may be related to the connecting device itself, i.e., the switch.

According to one aspect of the invention, the method and system to build a self-configuring network includes deploying commands to selected switches in the network to automatically provision them with appropriate network resources as needed. For example, the method and system includes deploying commands to selected switches to configure one or more ports on the switches to support a service such as an Internet Protocol ("IP") telephony service. The deployed commands may then be triggered to configure the port whenever a VoIP telephone attempts to connect to the network through the switch. Similarly, other commands may be deployed and triggered to remove the configuration whenever the VoIP telephone disconnects from the network.

According to one aspect of the invention, the method and system to build a self-configuring network includes selecting one or more targets to which the commands may be deployed. Selecting the targets includes selecting one or more ports and/or switches, and binding the commands to the selected ports and/or switches. As such, the selected deployment target(s) may include a group of switches and/or a group of ports residing on one or more switches, where the switches, ports, and/or groups of switches and ports may be selectable through a network management system. The groups are typically pre-defined by a network administrator in the network management system based on various criteria, such as a group of ports for supporting Internet Protocol (IP) telephony services in the network, or a group of ports for supporting a Virtual Local Area Network.

According to one aspect of the invention, the method and system to build a self-configuring network includes selecting the network events that trigger the commands to execute on the selected deployment target(s). Selecting the network events that trigger the commands to execute includes binding the commands to the selected network events. The selected network events may include any network event that might occur in the network. For example, the selected network events may include events that occur when a device or user attempts to connect to the network, such as a device detected or undetected event, or a user authenticated or un-authenticated event. The network events are typically pre-defined by a network administrator in a network management system from which the events may be selected.

According to one aspect of the invention, the method and system to build a self-configuring network includes deploying the commands to the selected deployment target(s). The method and system to build a self-configuring network includes deploying the commands to the selected deployment target(s) on demand, such as in response to a request by a network administrator, or according to a pre-determined schedule, or even in response to detecting a condition on the network requiring redeployment. Some examples of conditions in the network requiring redeployment include, among others, the detection of a rebooted or replacement switch, or a change in the composition of the group(s) of switches and ports comprising the selected deployment target(s).

According to one aspect of the invention, the method and system to build a self-configuring network includes storing the commands in a profile and maintaining a repository of information about the profiles. The repository may be implemented as a profile information database that contains data about the profiles, such as the name, location, and version of the profile, the last date it was modified, whether the profile has been deployed, or whether the profile has been enabled or disabled, the selected events and deployment targets to which the profile has been bound, and the name and IP address of the network device on which the profile has been stored, as well as the date that the network device was last accessed through a network management system.

According to one aspect of the invention, the method and system to build a self-configuring network may further include auditing the self-configuring network by tracking the deployment of the profile to the selected deployment target(s), including tracking execution of the commands contained in the profile when they are triggered to execute on the selected deployment target(s) upon the occurrence of the selected event(s) to which the profile is bound.

According to one aspect of the invention, the method and system to build a self-configuring network may further include managing the self-configuring network, including managing the deployment targets and network events to which the profile are bound, testing and validating the commands contained in the profile prior to deployment, as well as requesting and scheduling deployment of the profile and confirming the results of deployment and/or execution of the commands contained in the profile on the deployment targets.

According to one aspect of the invention, building and managing the self-configuring network is facilitated through the use of a graphical user interface by providing network administrators with a user-friendly interface to, among other things, view and manipulate profiles containing the commands, select the deployment target(s) and the network events to which the commands/profiles are bound, request the deployment and redeployment of commands/profiles, and validate, test, and audit the results of deployment of the commands/profiles to the selected deployment target(s).

According to one aspect of the invention, upon successful deployment of the commands to the selected deployment target(s), the occurrence of the selected network event to which the commands were bound automatically triggers execution of the commands on the affected deployment target. The resulting dynamic port configuration change enforces a particular policy on the affected port or ports, thereby provisioning the affected deployment target with the appropriate network resource(s), such as access to an appropriate IP telephony call server.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above-described method and system to build and manage a self-configuring network.

BRIEF DESCRIPTION OF DRAWINGS

The present invention will be described by way of exemplary embodiments, but not limitations, illustrated in the accompanying drawings in which like references denote similar elements, and in which:

FIGS. 8-17 illustrate embodiments of a graphical user interface for facilitating building and managing a self-configuring network that automatically provisions a switch with network resources in accordance with an embodiment of the invention.

DETAILED DESCRIPTION OF THE INVENTION

In the following description various aspects of the present invention, a method and system to build a self-configuring network, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method, system and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system, switch, or other network device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
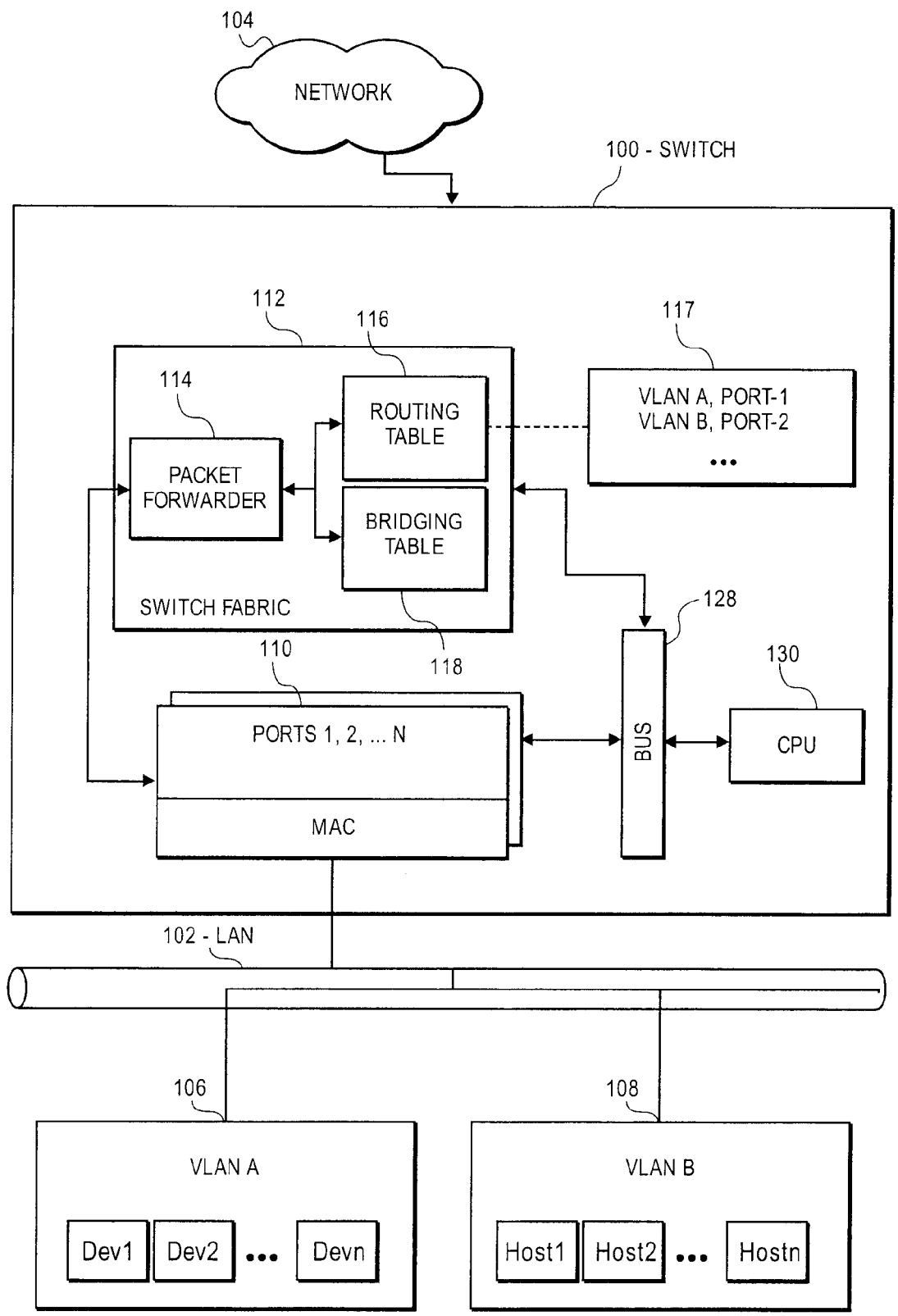
FIG. 1 is a block diagram illustrating certain aspects of a switch in a Local Area Network (LAN), an example of an operating environment in which the invention may be practiced.

FIG. 1 is a block diagram illustrating certain aspects of a switch in a Local Area Network (LAN), and serves as an example of an operating environment in which the invention may be practiced. A network device 100 functioning as a connecting device, such as a switch, router, or hub, collectively referred to herein as a switch, connects a local area network LAN 102 serving virtual LANs VLANA 106 and VLANB 108 to inter-network 104. The switch 100 comprises several ports, including the illustrated ports 110 numbered "1," "2," and so forth, each having a Media Access Control MAC chip 111 or similar component to connect the port 110 to LAN 102. The switch 100 further comprises a switch fabric 112 that typically includes, among other components, a bus 128, a central processing unit (CPU) 130, a packet forwarder 114, a routing table 116, a bridging table 118, and a port description table 117 for carrying out packet-forwarding operations on behalf of the devices and hosts connected to the LAN and VLANs.

Figure 2:
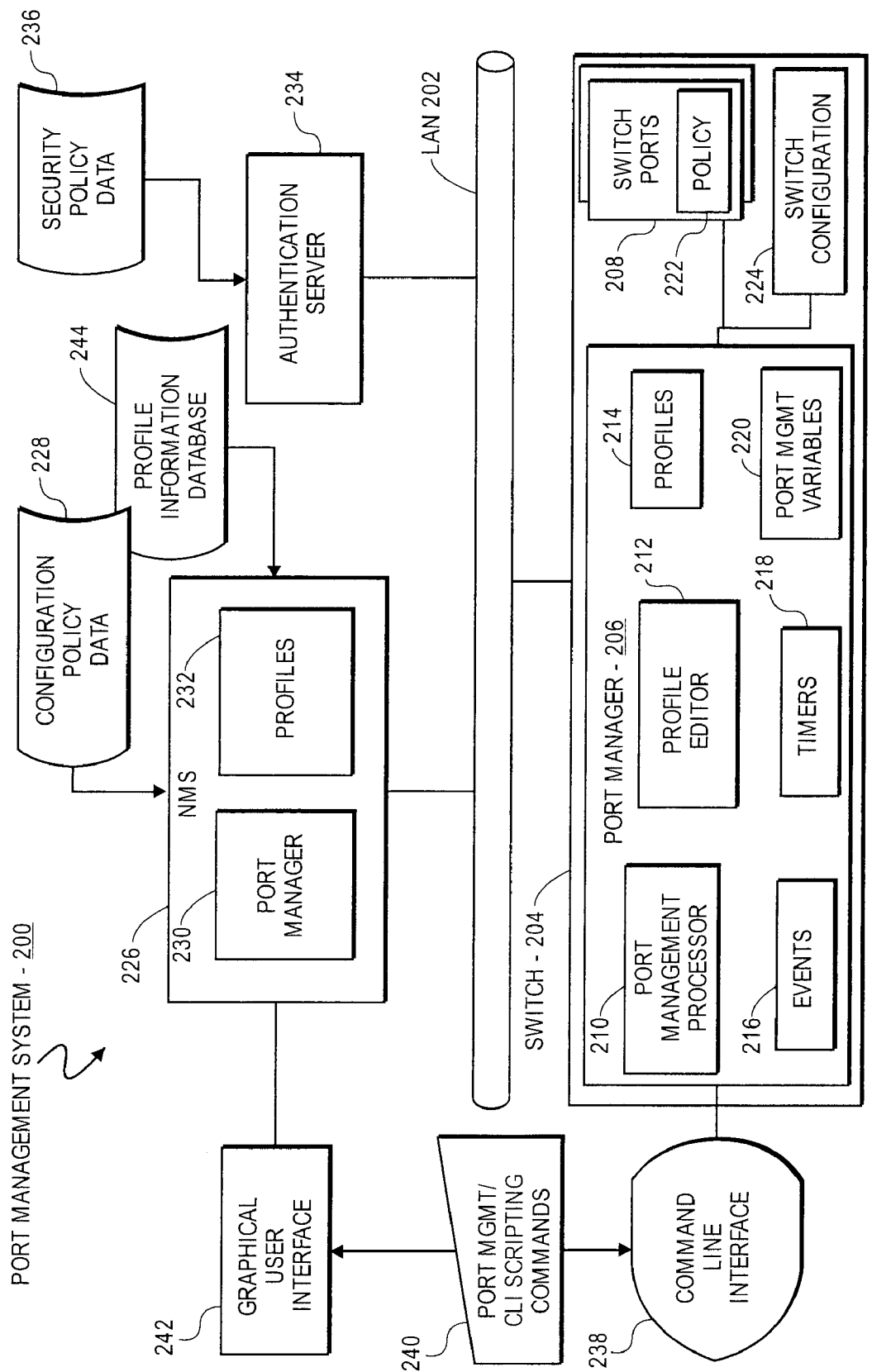
FIG. 2 is a block diagram illustrating certain aspects of a port management system in which a method and system to build and manage a self-configuring network may be practiced, including a switch and a network management system incorporating a port manager and other components for automatically provisioning the switch with network resources, in accordance with an embodiment of the invention.

FIG. 2 is a block diagram illustrating certain aspects of a port management system 200 in which a method and system to build and manage a self-configuring network may be practiced. The port management system 200 includes a network management system (NMS) 226 and a switch 204, both of which incorporate various components for automatically provisioning the switch with network resources in accordance with an embodiment of the invention. In a typical embodiment, the port management system 200 complements a port-based network access control system implemented on the LAN 202, such as port-based network access control implemented using the IEEE 802.1X standard. The port management system 200 may operate in conjunction with the NMS 226, which has access to configuration policy data 228 for the LAN as well as an authentication server 234, which has access to a security policy data 236 for the LAN.

In the illustrated embodiment of the port management system 200, the NMS 226 is provided with a port manager 230 having components that are typically accessed via a graphical user interface (GUI) 242. In a typical embodiment, a network administrator interacts with the port manager 230 in the NMS 226 via the GUI 242 to build and manage a self-configuring network as will be described in further detail in FIG. 3. Generally, the port manager 230 operates in conjunction with the NMS 226 to facilitate the configuration and deployment of setup instructions to the switches 204 that comprise the self-configuring network such that the switches are able to automatically provision themselves with the appropriate network resources as needed. This allows the network administrator to alter the network's behavior in a controlled manner either on demand, or automatically in response to the occurrence of a network event, including the detection of certain network behavior.

For example, in one embodiment, the network administrator might want to configure two different sets of profiles, one which alters the self configuring network's behavior to configure itself one way during the day, and another way during the night, or to configure itself one way in response to network behavior indicating a known threat, and another way in response to network behavior indicating a new threat. Using the method and system of the present invention, the profiles may be configured and automatically deployed from the NMS 226 to the switches 204 in response to the expiration of a timer and/or upon the occurrence of an event detected in the NMS. Similarly, once deployed, the profiles may be automatically executed on the switches 204 in response to the expiration of a timer and/or upon the occurrence of an event detected in the switch.

The setup instructions typically include various commands and data stored in profiles 232/214 that may be maintained in one or both of the NMS 226 and in the individual switches 204. In one embodiment, profiles 232 may be created, edited, stored and viewed on the NMS 226 and later deployed to the switch 204 and stored with profiles 214 for later execution on the port management processor 210. In some cases, profiles 214 stored on the switch 204 may be viewed and edited via the NMS port manager 230. A profile 214 is applied to the switch 204, i.e., executed on a switch, to configure the switch, such as to change a port configuration, or to update a policy that is enforced on the port. The types and uses of profiles 214 will be described in further detail below and in the commonly assigned co-pending U.S. application Ser. No. 11/731,135.

In one embodiment, information about the profiles 214/232, both those stored on a switch and those stored in the NMS 226, may be collected and stored in a repository such as a profile information database 244. The information that is collected and stored in the database 244 may include a variety of data, such as the name, location, and version of a profile, the last date it was modified, whether the commands contained in the profile have been deployed to one or more switches in the network, or whether they have been enabled or disabled, the selected events and deployment targets to which the profile is bound, and the name and IP address of the network device on which the profile is stored, as well as the date that the network device was last accessed through the NMS 226. Among other uses, the information collected and stored in the profile information database 244 may be used in the NMS 226 to help build and manage a self-configuring network, as will be described in further detail below.

Figure 3:
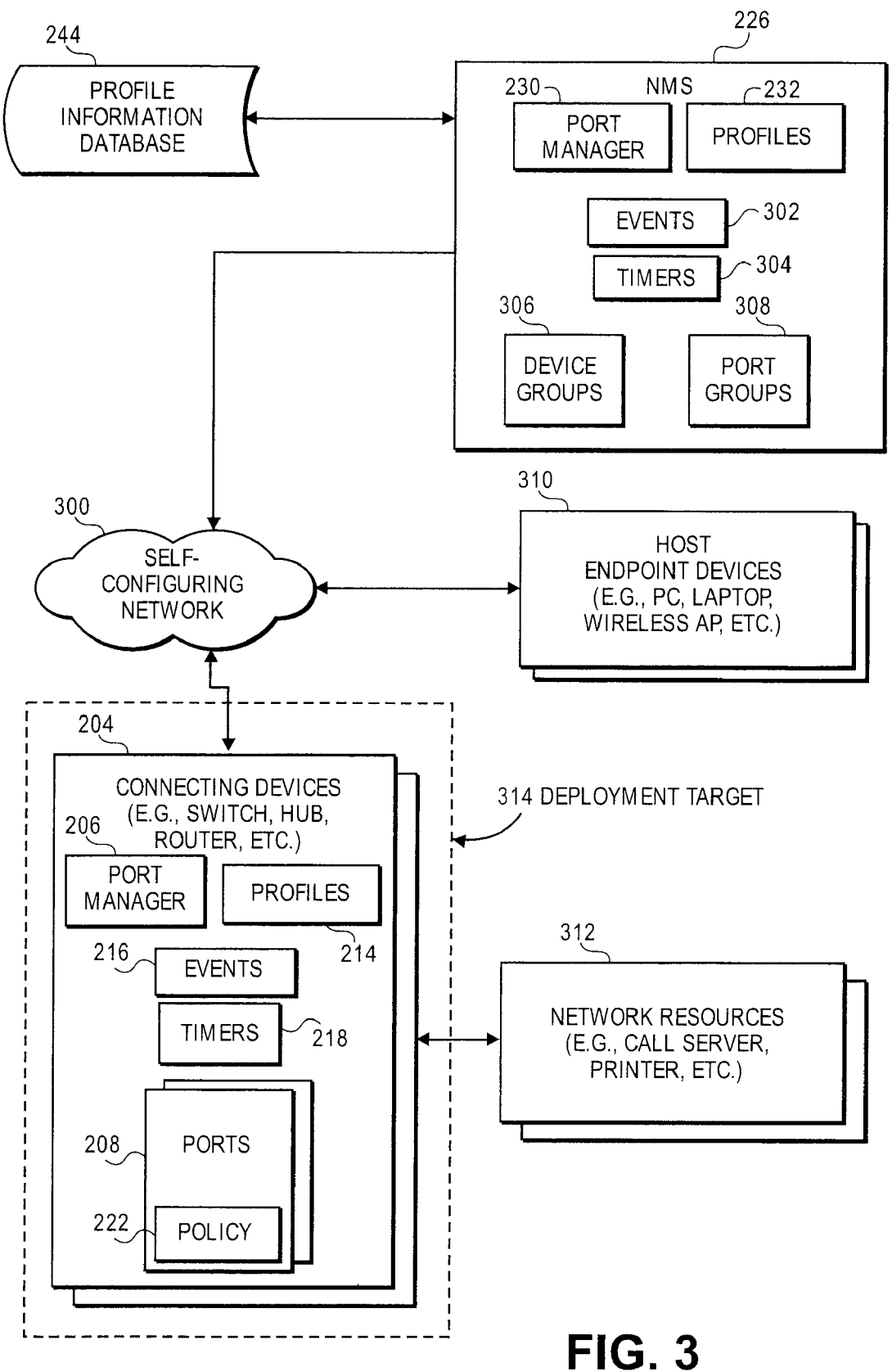
FIG. 3 is a block diagram illustrating certain aspects of a self-configuring network, including the connecting devices through which endpoint devices gain access to network resources, as well as the profiles and other components for automatically provisioning the connecting devices with appropriate network resources, as managed and deployed in accordance with an embodiment of the invention.

FIG. 3 is a block diagram illustrating certain aspects of a self-configuring network 300, including the connecting devices 204 through which endpoint devices 310 gain access to network resources 312, as well as the profiles 232/214, events 302/216, timers 304/218, port managers 230/206 and other components for automatically provisioning the connecting devices 204 with appropriate network resources 312, as managed and deployed in accordance with an embodiment of the invention. As shown, an NMS 226 having a port manager 230 provides a user, such as a network administrator, with the ability to select and/or generate profiles 232 and bind them with selected events/timers 302/304 and selected connecting devices 204 and/or selected ports 208 on those connecting devices, collectively referred to as deployment targets 314. In one embodiment, the port manager 230 provides the user with the ability to select the deployment targets 314 by presenting the user with one or more device groups 306 of connecting devices 204 and/or port groups 308 of one or more ports 208 across several connecting devices 204 that have been pre-defined on the NMS 226, and which are suitable targets to which to deploy a particular profile 232 that has been bound to a particular event 302 or timer 304.

In one embodiment, the port manager 230 provides the user with the ability to test, validate, and ultimately deploy a profile 232 to the selected deployment target(s). During testing, the port manager 230 deploys the profile 232 to a specified connecting device 204, and causes the device to initiate immediate execution of the profile as well as to report the results of executing the profile back to the port manager 230. During validation, the port manager 230 verifies whether a profile 232 can be deployed on the device(s) within the selected deployment target 314 using the events/timers 302/304 to which the profile has been bound, and the port(s) within the selected deployment target 314. During deployment, the port manager 230 deploys the profile to the device(s) within the selected deployment target 314.

In one embodiment, during deployment, the port manager 206 on each of the devices within the deployment target 314, i.e. the connecting devices 204, receives and stores deployed profiles 232 locally on the devices 204 as corresponding profiles 214 and sets the triggering events 216 and/or timers 218 on the target devices to match the events 302 and/or timers 304 to which the profiles 214 have been bound. After a successful deployment, the connecting devices 204 within the deployment target 314 are capable of automatically configuring their resident ports 208 within the deployment target 314 with the appropriate policy 222 whenever an endpoint device/user triggers an event 216, or, likewise, upon the expiration of a timer 218, on the resident port 208. As a result, the connecting devices 204 and ports 208 in the deployment target 314 form a self-configuring network 300, in which the connecting devices 204 are provisioned with the appropriate network resources 312 in a non-disruptive manner in accordance with an embodiment of the invention.

In one embodiment, in order to facilitate the deployment of profiles 232 to their corresponding targets 314, the port manager 230 may access information that has been collected and stored about the profiles 232, and in some embodiments, about the profiles 214, in a profile information database 244. In a typical embodiment, the information that is collected may include, but is not limited to, the name and version of a profile, where it was created/stored, the last date it was modified, the selected events/timers and deployment targets to which the profile is bound, and whether, when and/or where the profile was deployed. The information may be advantageously used in conjunction with the graphical user interface 242 to help a network administrator to build and manage the self-configuring network as will be described in further detail with reference to FIG. 5.

In one embodiment, the events 302 and timers 304 to which the profiles 232 are bound may include events and timers that occur in the NMS 226 itself, and not just those detected on a switch 204 where the profile is deployed. For example, the NMS 226 may be able to receive information regarding a security-related event 302 occurring in the network that requires a different set of profiles 232 to be deployed to the network such that the network's behavior can be quickly modified to respond to the threat. Using the method and system of the present invention, the network administrator can build and manage a self-configuring network with alternative sets of profiles for a particular deployment target 314. The alternative set of profiles can then be quickly deployed to all of the devices within a selected deployment target 314 as soon as the NMS 226 receives the security-related event 302. The alternative set of profiles typically contain instructions that alter the behavior of the switches on which they are deployed so as to mitigate the security threat. As another example, the NMS 226 can be set up with timers 304 to deploy one set of profiles during the day, and another set of profiles at night, where the profiles contain instructions that alter the behavior of the switches on which they are deployed, such as powering down devices to conserve power during the night and operate normally during the day.

It should be noted that, although the following description of the embodiments of the method and system to build and manage a self-configuring network 300 refers primarily to deploying profiles 232 to connecting devices 204 and ports 208 for the purpose of automatically provisioning the connecting devices 204 and ports 208 with the appropriate network resources 312 whenever an endpoint device 310 connects to the self-configuring network 300, other embodiments of the invention may facilitate provisioning the connecting device 204 whenever the connecting device itself first connects to a self-configuring network. For example, in one embodiment, the method and system may be used to deploy a profile containing IP address and other configuration information to a newly deployed switch, such as an edge switch. As an example, the configuration information may include commands that enable the switch ports to automatically join a particular subnet or an Ethernet automatic protection ring. The profile may be triggered, for example, by the occurrence of a proprietary type-length-value (TLV) in the LLDP corresponding to the newly deployed switch. In this manner, the connecting devices 204 are themselves self-configuring, allowing the self-configuring network 300 to remotely and automatically configure new and replacement switches in the network in a non-disruptive manner.

Figure 4:
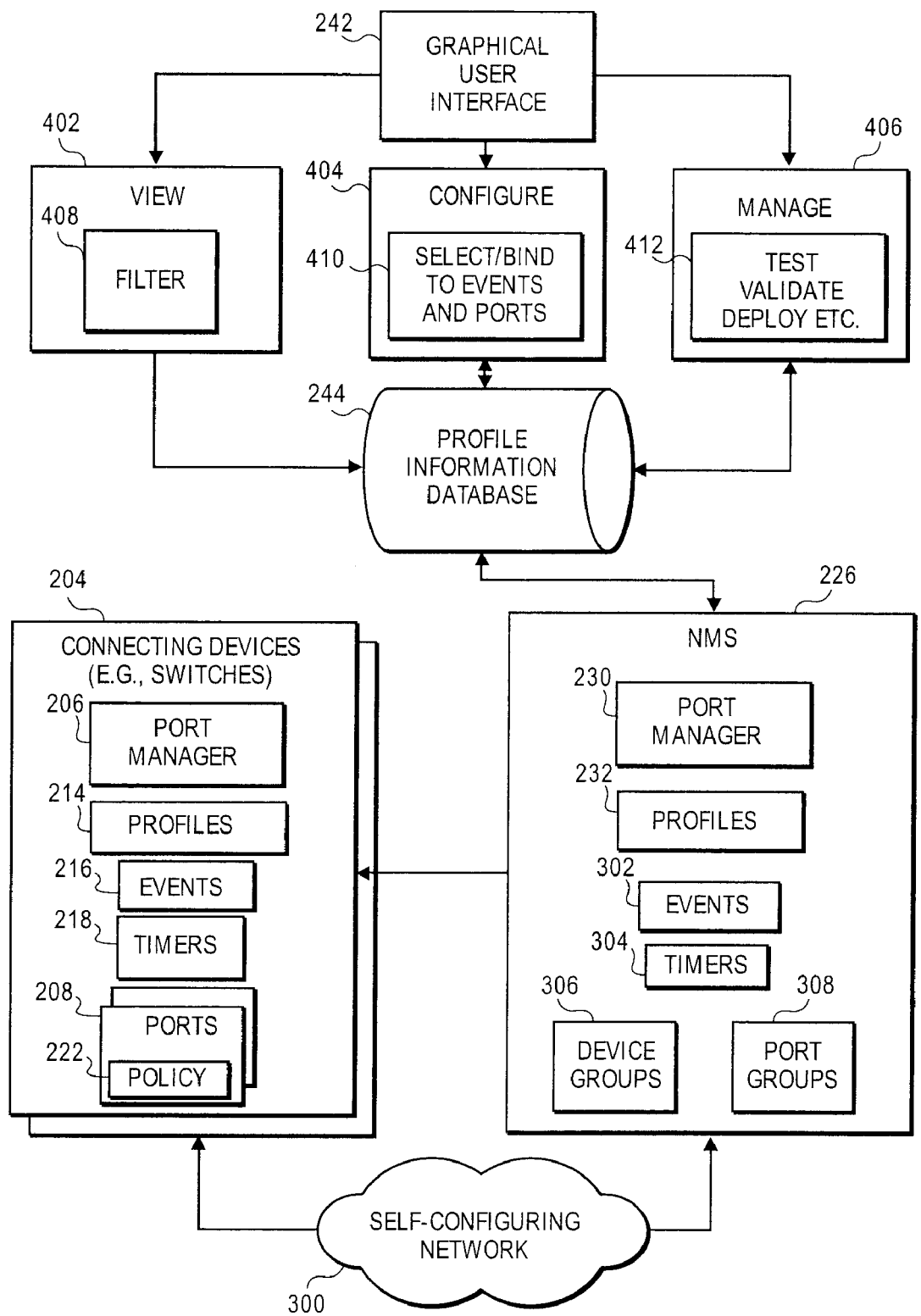
FIG. 4 is a block diagram illustrating certain aspects of a self-configuring network in which profiles that contain commands for automatically provisioning a switch with network resources are managed and deployed in accordance with an embodiment of the invention.
Figure 8:
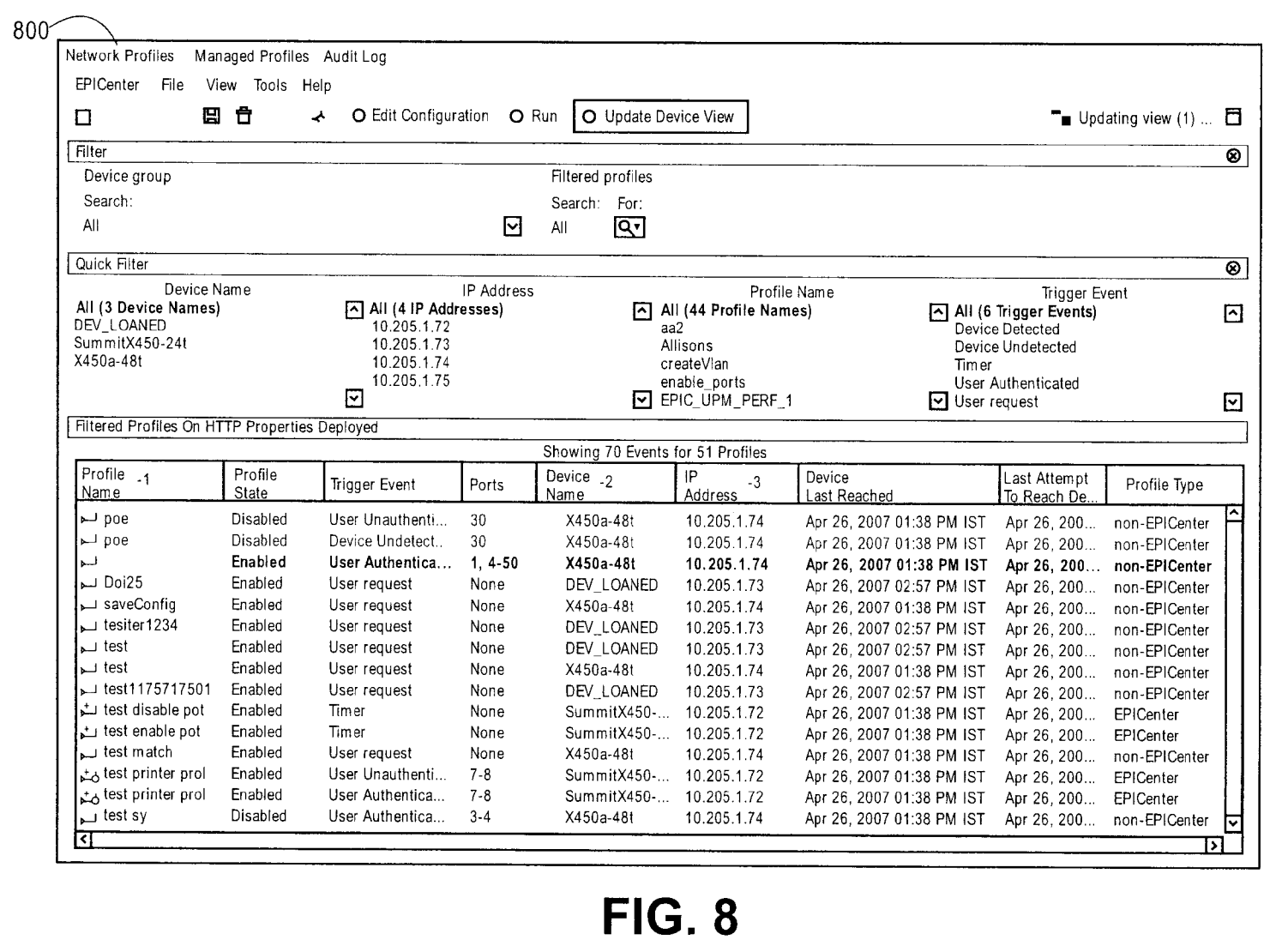

FIG. 4 is a block diagram illustrating certain aspects of a self-configuring network 300 in which profiles 214/232 containing commands for automatically provisioning a connecting device 204 with network resources are managed and deployed in accordance with an embodiment of the invention. As shown, a graphical user interface 242 to an NMS 226 having a port manager 230 and having access to a profile information database 244 includes, among others, interfaces to view 402, configure 404, and manage 406 a profile 232/214 in accordance with an embodiment of the invention. In a typical embodiment, the interfaces to view profiles may include a filter 408 that facilitates the selection of a subset of profiles to view based on certain characteristics, such as those profiles bound to a particular event or deployed to a specified connecting device or port, or group of ports. As such, the filtered subset of profiles that may be viewed may include, for example, profiles stored or deployed on certain devices, e.g., the devices that support VoIP access, or profiles bound to certain types of events, e.g., the profiles bound to events signaling detection of VoIP telephone access. In a typical embodiment, the interfaces to view profiles 402 may include an interface for viewing profiles that have been created and stored via a CLI 238 to a port manager 206 directly on a connecting device 204, generally referred to as a network profile view. An exemplary embodiment of a network profile view is illustrated in FIG. 8 under the tabbed interface labeled "Network Profiles," which will be described in further detail below. The interfaces to view profiles 402 may also include an interface for viewing profiles that have been created and stored via the graphical user interface 242 to the NMS 226 having port manager 230, generally referred to as a managed profile view. An exemplary embodiment of a managed profile view is illustrated in FIG. 9 under the tabbed interface labeled "Managed Profiles," which will be described in further detail below.

Figure 10:
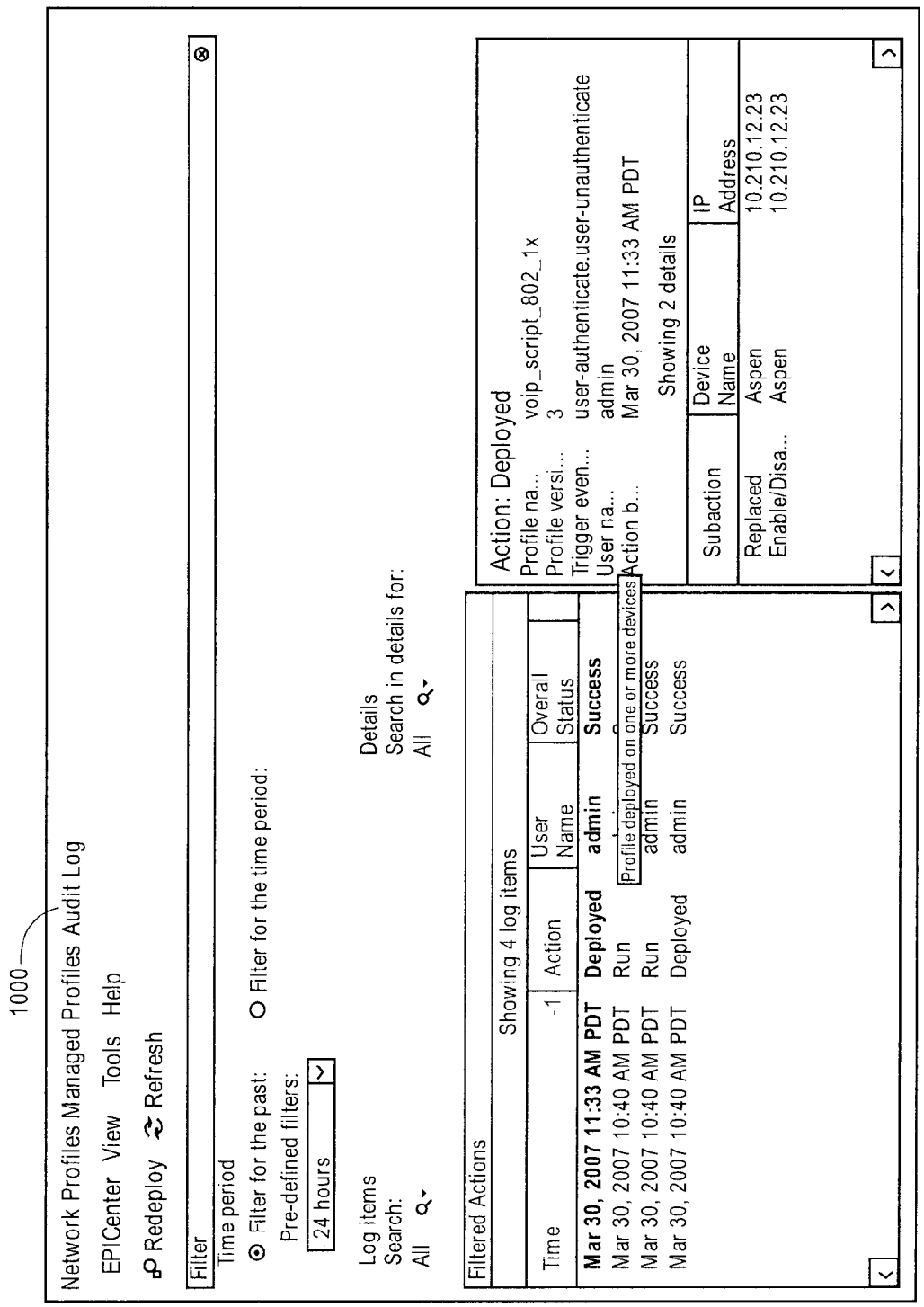

In one embodiment, the interfaces to view profiles 402 may also include an interface to view an audit log of the actions taken by profiles 214 during execution on the connecting devices 204 after they are triggered by the occurrence of the events 216 and/or timers 218 to which they are bound, or, in some cases, after they are executed on demand, such as during testing or validation of a profile 232/214. An exemplary embodiment of an audit log view is illustrated in FIG. 10 under the tabbed interface labeled "Audit Log," which will be described in further detail below. The audit log view helps the network administrator monitor the profile actions taken in a self-configuring network 300.

In a typical embodiment, the interfaces to configure profiles 404 may include, but are not limited to, interfaces 410 to select the events/timers 302/304 that trigger the profiles, as well as interfaces to select the connecting devices 204 and ports 208 comprising the deployment target 314. In one embodiment the interfaces to select the connecting devices 204 and ports 208 comprising the deployment target 314 may operate in conjunction with device groups 306 and port groups 308 that have been predefined on the NMS 226 to support access to certain network resources 312, such as a VoIP call server.

In a typical embodiment, the interfaces to manage profiles 406 may include, but are not limited to, interfaces 412 to test, validate, and deploy profiles that have already been configured, i.e., profiles for which the triggering events/timers 302/304 and connecting devices 204 and ports 208 comprising the deployment target 314 have already been selected.

In one embodiment the interfaces to configure profiles 404 and manage profiles 406 may be implemented as one or more interactive dialogs, such as a wizard, that guide and prompt a user to make appropriate selections using various selection buttons, check lists, pull-down lists, text entry interfaces, and the like. Exemplary embodiments of interfaces to configure profiles 404 and manage profiles 406 are illustrated in FIGS. 11-17, which will be described in further detail below.

Figure 5:
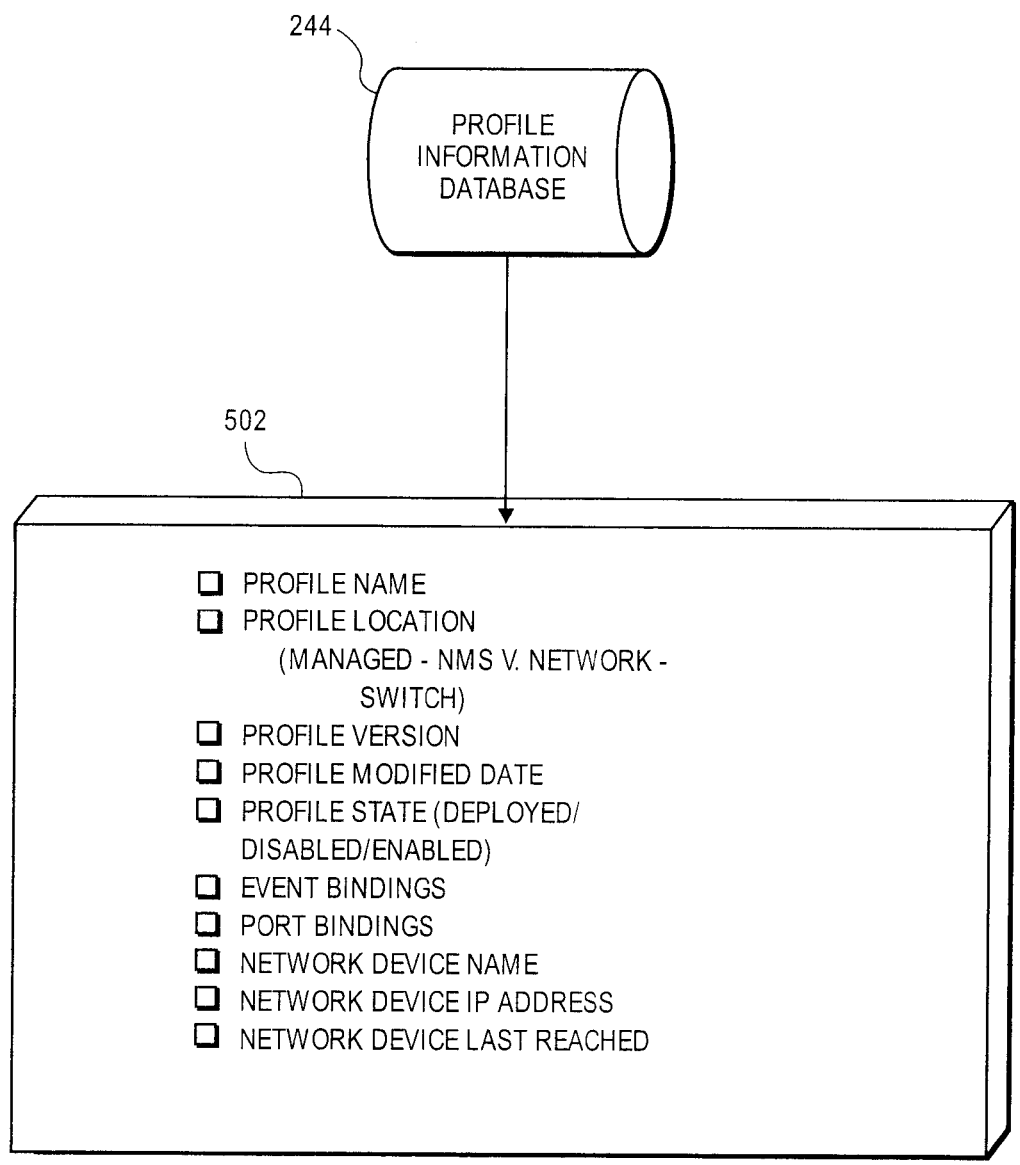
FIG. 5 is a block diagram illustrating an example of the contents of a profile information database in which information is maintained about the profiles, deployment targets, and network events used to build and manage the self-configuring network that automatically provisions a switch with network resources in accordance with an embodiment of the invention.

FIG. 5 is a block diagram illustrating an example of the contents of a profile information database 244 in which information is maintained about the profiles 232/214, deployment targets 314, events 302/216 and timers 304/218 used to build and manage the self-configuring network 300 that automatically provisions the targeted connecting devices 204 with network resources 312 in accordance with an embodiment of the invention. As shown, the information may include, but is not limited to, data such as profile name, profile location, profile version, profile modified date, whether the profile has been deployed and/or is disabled or enabled, the events and ports to which the profile is bound, and the name, IP address, and date/time that the connecting device 204 on which a profile has been deployed or created was last reached via the NMS 226. In a typical embodiment, the profile information database 244 may be stored on a disk storage medium and accessed via the port manager 230 or other component of an NMS 226 using a file server.

Figure 6:
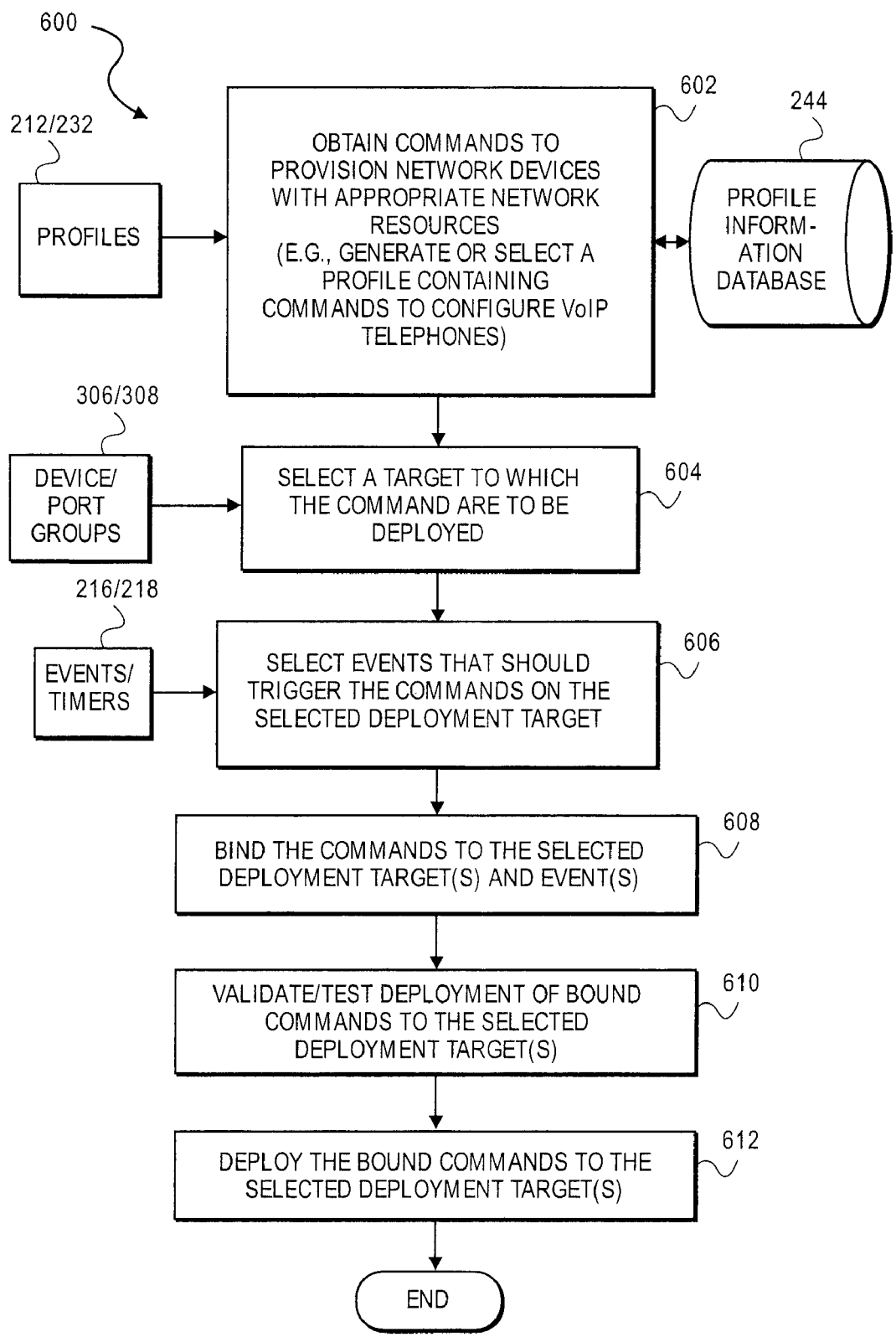
FIG. 6 is a flow diagram illustrating certain aspects of a method to be performed to build and manage a self-configuring network that automatically provisions a switch with network resources in accordance with an embodiment of the invention.

FIG. 6 is a flow diagram illustrating certain aspects of a method 600 to be performed to build and manage a self-configuring network 300 that automatically provisions a connecting device 204 with network resources 312 in accordance with an embodiment of the invention. In one embodiment, at block 602, the method 600 obtains commands to provision network devices, i.e. connecting devices 204, with appropriate network resources. The commands may be obtained, for example, via selection of an existing profile 212/232 that contains such commands, or by generating such commands from scratch using the facilities of an GUI 242 or a CLI 228. In one embodiment, if an existing profile containing such commands is obtained from a connecting device 204, or generated directly on a connecting device 204 from scratch using the CLI 228, it may be imported into an NMS 226 so that it can be used in port manager 230 to build and manage a self-configuring network 300. In one embodiment, the profile information database 244 may be used to facilitate obtaining the profiles 212/232 containing the desired commands for building and managing the self-configuring network.

At block 604, the method 600 selects a target to which the commands are to be deployed. In a typical embodiment, the deployment target may be selected from one or more groups of connecting devices 306 and/or ports 308 that have been pre-defined on an NMS 226. The method 600 continues at block 606, in which the events/timers that will trigger the commands on the selected deployment target are selected from one or more events 302 and/or timers 304 that have been pre-defined on the NMS 226.

At block 608, the method 600 binds the profile 232 to the selected deployment target(s) and event(s)/timer(s). In a typical embodiment, the method 600 binds the profile by associating the profile 232 containing the commands to the devices and ports in the deployment target 314, i.e., to the connecting devices 204 and ports 208 specified in the selected device/port groups 306/308, as well as by associating the profile to the selected events 302 and/or timers 304. A record of the associated devices, ports, events, and timers to which the profile is bound may be stored in the profile information database 244.

The method 600 continues at process block 610, in which a profile may be tested and validated before being deployed to the selected deployment target at the request of a user/network administrator. In a typical embodiment the profile is tested and validated by temporarily deploying the profile to a particular connecting device 204, executing the commands contained in the profile, and reporting the results back to the requester using the facilities of the NMS. Once tested and validated, the method 600 continues at process block 612, in which the profile may be deployed to the selected deployment target. In a typical embodiment, the devices 204 within the selected deployment target receive and locally store the profiles 232 containing the commands as corresponding profiles 214. The devices 204 set the triggering events 216 and/or timers 218 in the device to match the events 302 and/or timers 304 to which the commands were bound, i.e., with which the profiles 232 containing the commands were associated. Upon successful deployment, the connecting devices 204 and ports 208 comprising the selected deployment target form a self-configuring network 300 in which the devices 204 are automatically provisioned with appropriate network resources 312 upon the occurrence of the triggering events 216 and/or timers 218.

Figure 7:
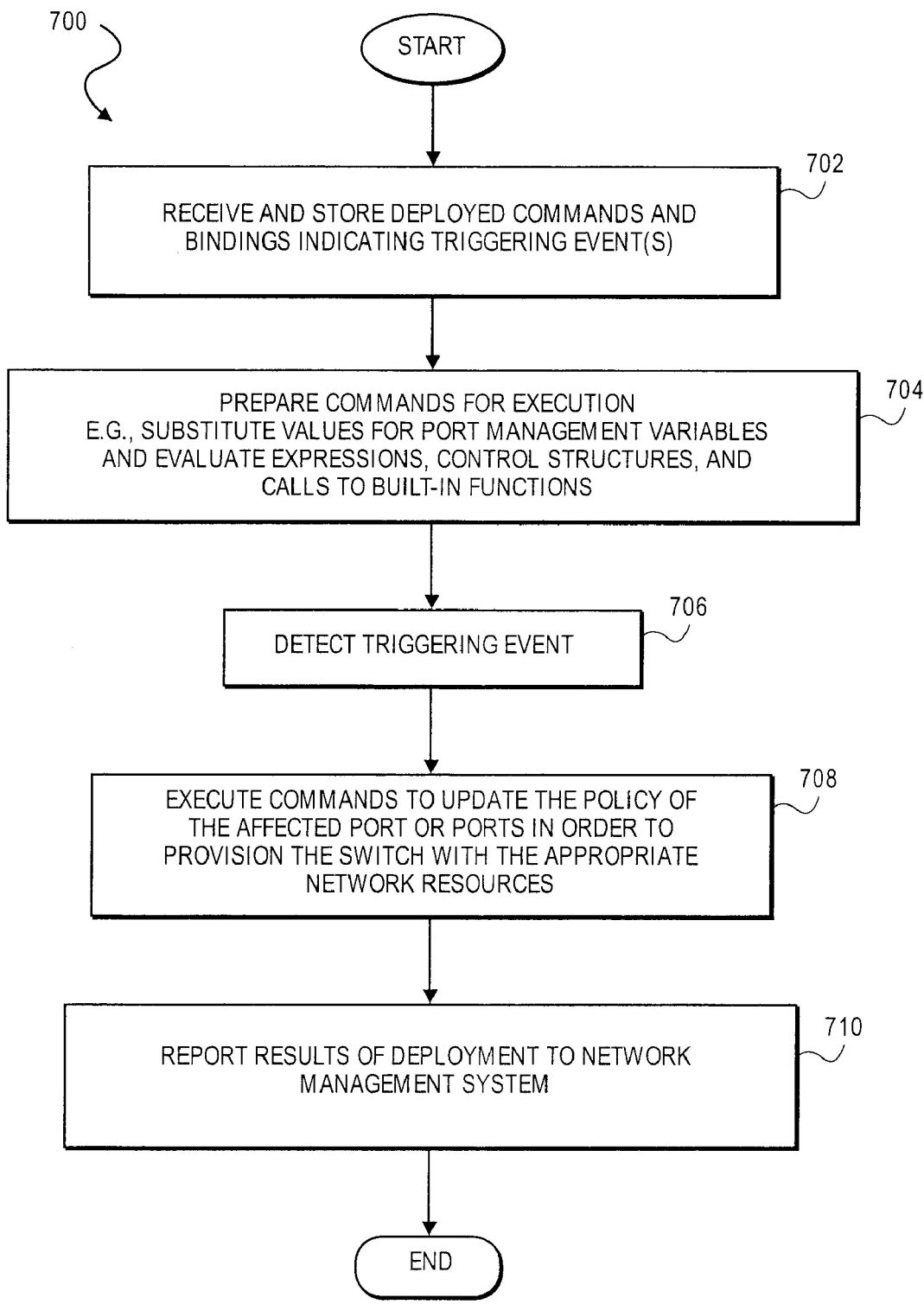
FIG. 7 is a flow diagram illustrating certain other aspects of a method to be performed to build and manage a self-configuring network that automatically provisions a switch with network resources in accordance with an embodiment of the invention.

FIG. 7 is a flow diagram illustrating certain other aspects of a method 700 to be performed to build and manage a self-configuring network 300 that automatically provisions a connecting device 204 with network resources 312 in accordance with an embodiment of the invention. At block 702, the method 700 receives and stores the deployed profile and bindings indicating the triggering event(s) and/or timer(s). For example, a connecting device 204 that is part of a selected deployment target 314 may receive a profile 232 that has been deployed from port manager 230 of NMS 226, in which the profile contains the commands to automatically provision the device with access to a VoIP call server. The device 204 locally stores the profile 232 as profile 214 and sets the events 216 and timers 218 to match the corresponding events 302 and timers 304 with which the profile 232 was associated, as well as the affected ports 208 on the device with which the profile 232 was associated.

In one embodiment, the method 700 continues at block 704 in which the commands contained in the deployed profile 214 may optionally be prepared for execution, for example, by substituting values for various port management values that may be present in the commands, and/or by evaluating expressions, control structures, and calls to built-in functions that may be present in the commands, as described in detail in commonly assigned co-pending U.S. patent application Ser. No. 11/731,135, entitled PORT MANAGEMENT SYSTEM.

At block 706, the method 700 continues, detecting a triggering event and/or the expiration of a timer that is associated with the profile 214. The method 700 continues at block 708 to execute the commands contained in the profile 214 in order to properly configure the device 204 and ports 208 and update the policy 222. As a result, the device 204 and affected ports 208 are provisioned with the appropriate network resources 312.

At block 710, the method 700 concludes, optionally reporting the results of the execution of the commands contained in the deployed profile 214 to port manager 230 of NMS 226. For example, the profile 214 may include a command that will automatically create a log entry on the device 204 at the conclusion of the profile execution. The log entry may subsequently be retrieved and viewed using an interface to view an audit log of the actions taken by profiles 214 during execution on the connecting devices 204 that may be provided as part of the graphical user interface 242. In this manner the self-configuring network 300 may be monitored, enabling network administrators to quickly determine when problems arise and to take corrective actions.

FIGS. 8-17 illustrate embodiments of a graphical user interface 242 for facilitating building and managing a self-configuring network 300 that automatically provisions a connecting device 204 with network resources 312 in accordance with an embodiment of the invention. FIG. 8 illustrates a tabbed interface having a network profiles 800 tab that displays a network profile view that shows users a summary of information about all or selected profiles 214 on their network, whether they were deployed to a connecting device 204 via the graphical user interface 242 to the port manager 230 in the NMS 226, or whether they were generated directly on the connecting device 204 via the command line interface to the port manager 206 in the device 204 itself. The information is typically obtained from the profile information database 244, and may include information such as the trigger events to which the profiles are bound, the device ports on which the profiles will be executed, whether the profile is enabled or disabled, etc, as described with reference to FIG. 5.

For example, with reference to the illustrated network profiles view in FIG. 8, to view the profiles triggered by an event indicating detection of endpoint devices attempting to access the network through a particular connecting device that belongs to a device group, the user would:

1 Select the device group of interest from the Device Group pull-down search list;

2. Select All from the Filtered Profiles pull-down search list (indicating all events and ports);

3 Navigate to the Quick Filter and select the particular connecting device in the selected device group using the Device Name pull-down list, or alternatively select the IP Address of the connecting device from the IP Address pull-down list; and 4 Select the event "Device Detected" from the Trigger Event pull-down list. Upon the completion of the user selections 1-4 above, the Filtered Events and Ports table displays all profiles that are triggered by the event Device Detected for the particular connecting device in the selected device group.

By manipulating the user selections, a user may view any number of different subsets of selected profiles on their network. In this manner the network profile view 800 helps a network administrator to manage a self-configuring network by allowing him or her to view, for example, which profiles are no longer be stored or enabled on the devices in which they were originally deployed, which profiles are currently enabled or stored on a device, which profiles are triggered by specified events, which profiles are bound to specified ports, etc.

FIG. 9 illustrates a tabbed interface having a managed profiles 900 tab that displays a managed profile view that shows users a summary of information about all or selected profiles 232 that may be managed using the port manager 230 functions provided in the NMS 226. The profiles 232 may include profiles that have not yet been deployed as well as profiles that have already been deployed. For those profiles 232 that have been deployed, the managed profile view may show users, among other things, a list of the devices to which the profile has been deployed. The managed profiles view allows users to manipulate the profiles 232, such as creating, editing, saving, importing, copying, deleting, testing and deploying.

FIG. 10, illustrates a tabbed interface having an audit log 1000 tab that displays the actions associated with a particular profile 232, such as when and whether the profile was deployed, whether the deployment was successful, a record of each time the profile was executed in response to the occurrence of a triggering event or expiration of a timer, the version of the profile that was deployed, whether it replaced an earlier version of the profile, whether the profile is currently enabled, etc.

Figure 12:
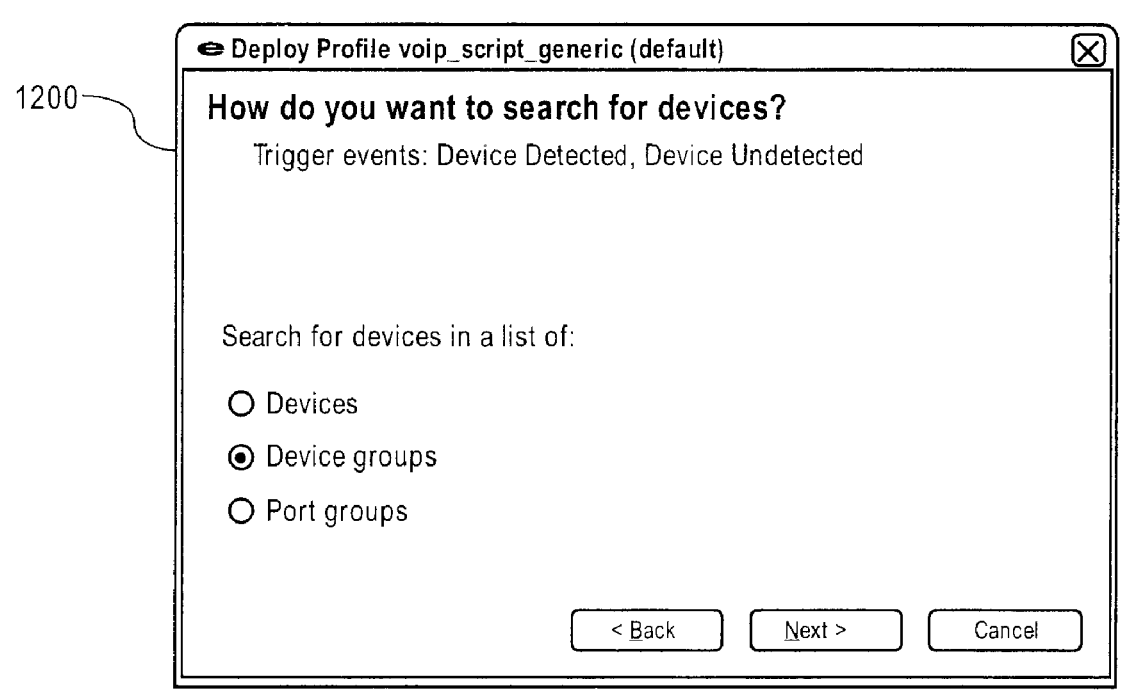

FIGS. 11-14 illustrate examples of a dialog interface that prompts a user to make the appropriate selections when configuring and deploying a profile 232 to a deployment target 314. For example, in FIG. 11, dialog box 1100 prompts users to select which events 302 and/or timers 304 should trigger execution of a profile 232. FIG. 12 illustrates a dialog box 1200 that prompts users to select the deployment target 314 by a particular device or by groups of devices or ports. FIG. 13 illustrates a dialog box 1300 that prompts users to select the devices or groups of devices in the deployment target 314, whereas FIG. 14 illustrates a dialog box 1400 that prompts users to select the ports or groups of ports in the deployment target 314.

Figure 15:
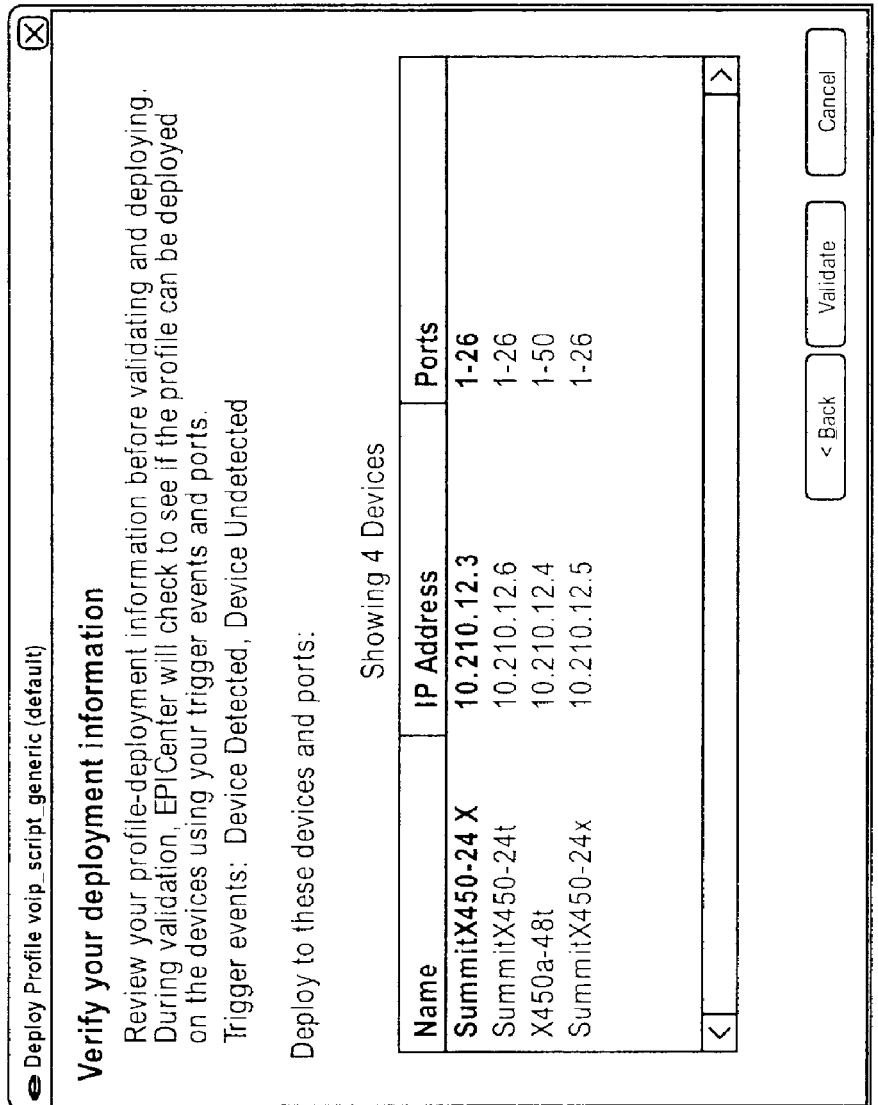
Figure 16:
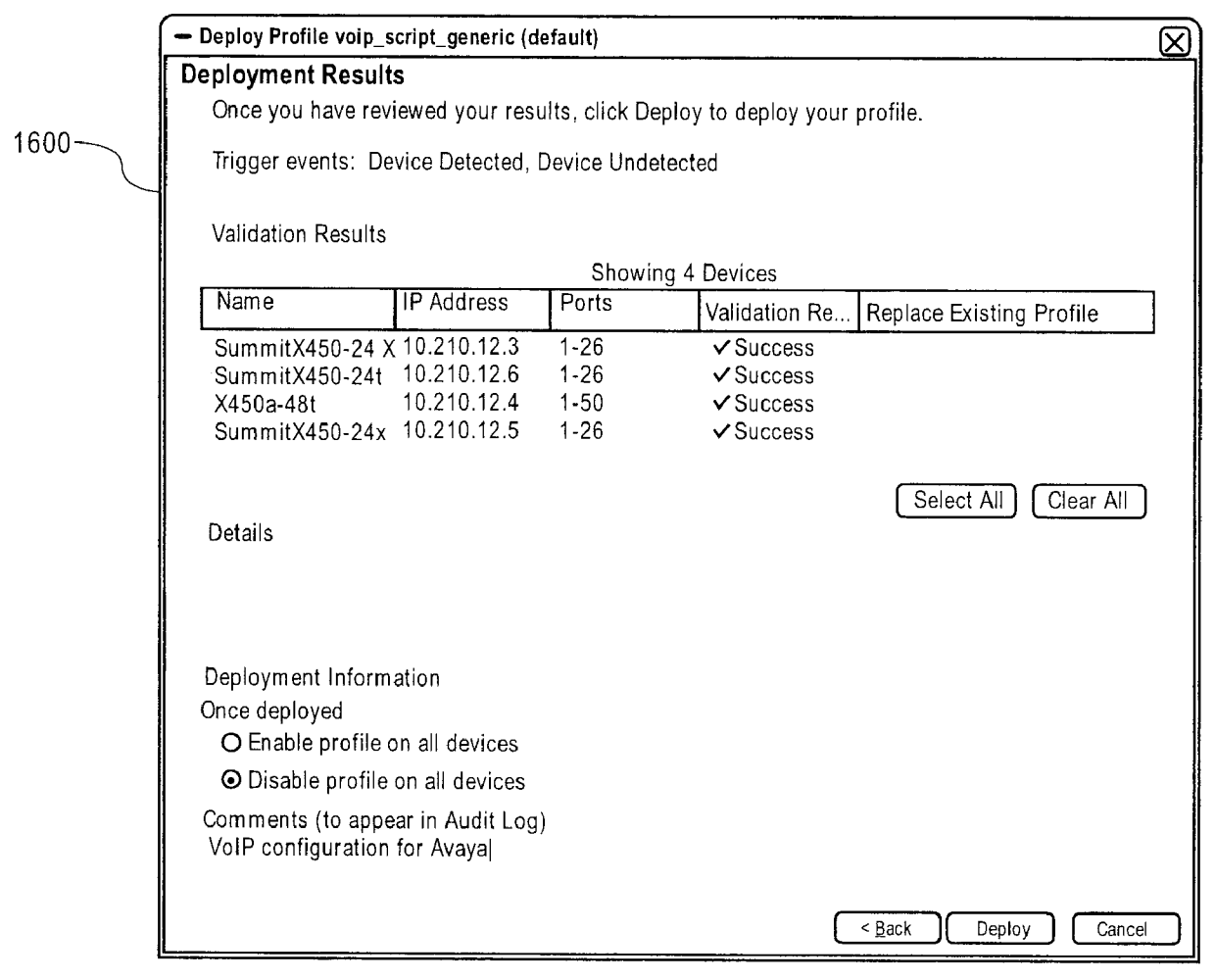
Figure 17:
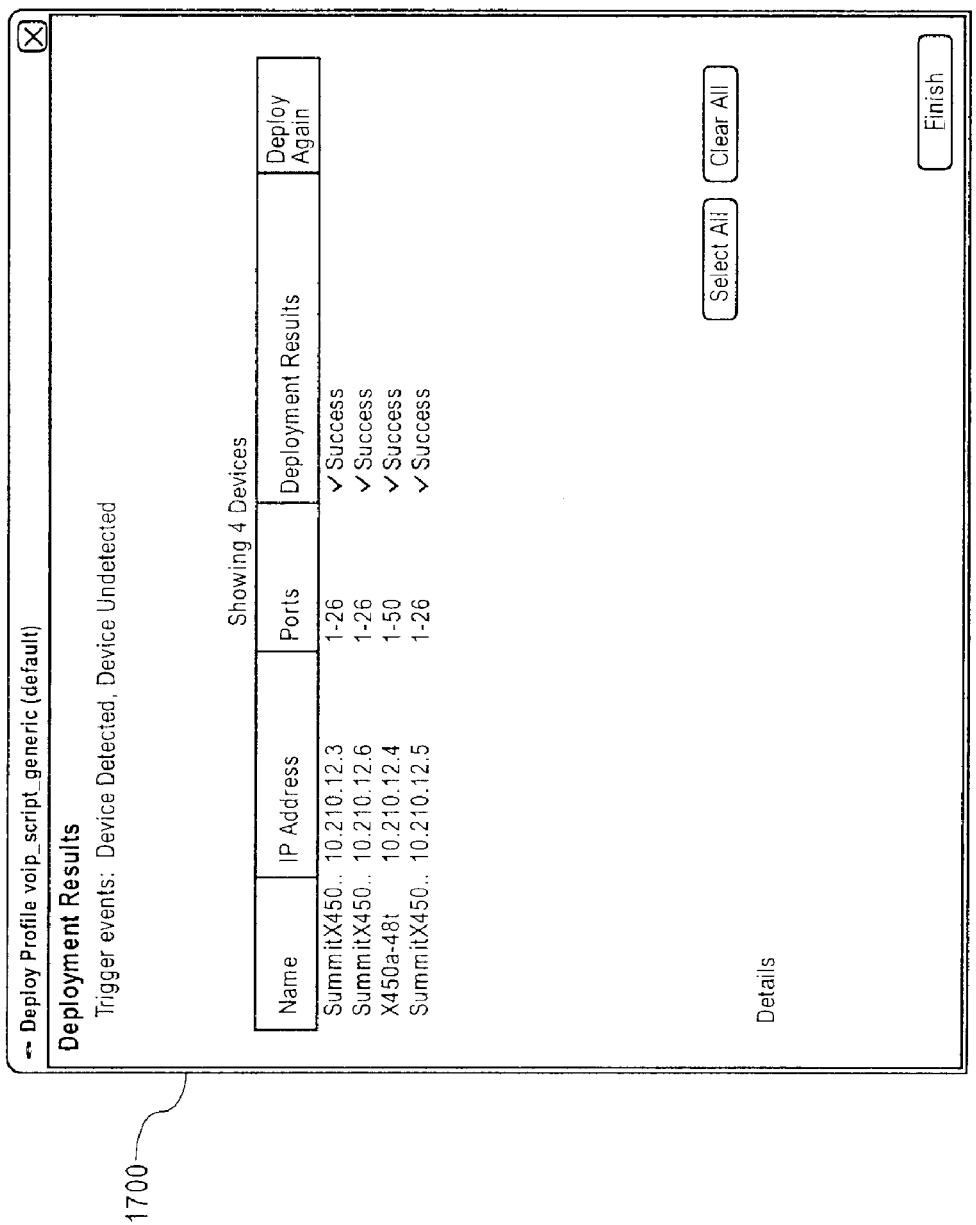

FIGS. 15-17 illustrate examples of dialog interfaces that guide the user through the remaining steps of deploying a profile 232 to a deployment target 314. In FIG. 15, a dialog box 1500 prompts users to verify the devices and/or ports that they have selected to be in the deployment target 314. In FIG. 16, a dialog box 1600 prompts users to initiate validation of the configuration of the profile, and displays the results of validation. Finally, in FIG. 17, a dialog box 1700 allows the user to initiate the deployment of selected profiles and to view the results of deployment.

Figure 18:
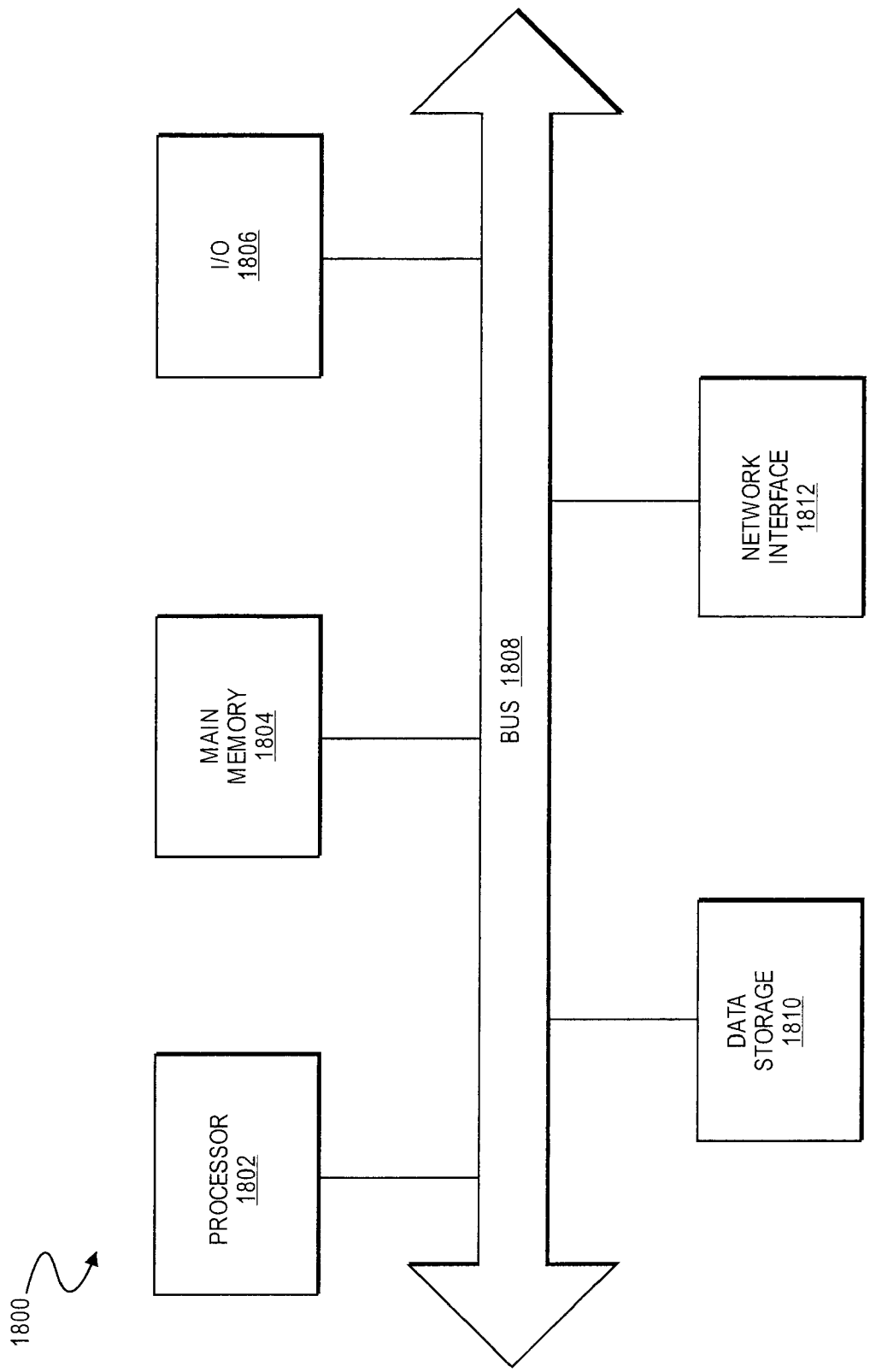
FIG. 18 illustrates one embodiment of a suitable computing environment in which certain aspects of the invention illustrated in FIGS. 2-17 may be practiced.

FIG. 18 illustrates one embodiment of a suitable computing environment in which certain aspects of the invention illustrated in FIGS. 1-17 may be practiced. In one embodiment, the method and system to build and manage a self-configuring network 300 in accordance with an embodiment of the invention may be implemented on a computer system 1800 having components 1802-1812, including a processor 1802, a memory 1804, an Input/Output device 1806 a data storage 1810, and a network interface 1812, coupled to each other via a bus 1808. The components perform their conventional functions known in the art and provide the means for implementing the port management system 200. Collectively, these components represent a broad category of hardware systems, including but not limited to general purpose computer systems, servers, switches, routers, hubs and other specialized packet-forwarding devices.

In one embodiment, the memory component 1804 may include one or more of random access memory (RAM), and nonvolatile storage devices (e.g., magnetic or optical disks) on which are stored instructions and data for use by processor 1802, including the instructions and data that comprise the port managers 206 on the connecting devices 204 as well as the port manager on the NMS 226, as well as the profiles 214/232, events 216/302, timers 218/304, profile information database 244, and the various functions embodied in the graphical user interface 242 and command line interface 238. The data storage component 1810 may also represent the instructions and data that comprise the port managers 206 on the connecting devices 204 as well as the port manager on the NMS 226, as well as the profiles 214/232, events 216/302, timers 218/304, profile information database 244, and the various functions embodied in the graphical user interface 242 and command line interface 238. In one embodiment, the network interface component 1812 may include the ports 208 on connecting devices 204.

It is to be appreciated that various components of computer system 1800 may be rearranged, and that certain implementations of the present invention may not require nor include all of the above components. Furthermore, additional components may be included in system 1800, such as additional processors (e.g., a digital signal processor), storage devices, memories, network/communication interfaces, etc.

In the illustrated embodiment of FIG. 18, method and system to build and manage a self-configuring network 300 in accordance with an embodiment of the invention as discussed above may be implemented as a series of software routines executed by computer system 1800. The software routines may comprise a plurality or series of instructions, code sequences, configuration information, or other data to be accessed and/or executed by a processing system such as one or more of processor 1802. Initially, the series of instructions, code sequences, configuration information, or other data may be stored on a data storage 1810 and transferred to memory 1804 via bus 1808. It is to be appreciated that the series of instructions, code sequences, configuration information, or other data can be stored on a data storage 1810 using any conventional computer-readable or machine-accessible non-transitory storage medium, such as a diskette, CD-ROM, magnetic tape, DVD, ROM, etc. It is also to be appreciated that the series of instructions, code sequences, configuration information, or other data need not be stored locally, and could be stored on a remote storage device, such as a server on a network, and received locally via a network/communication interface 1012. The instructions, code sequences, configuration information, or other data may be copied from the data storage 1810, such as mass storage, into a memory 1804 and accessed and executed by processor 1802.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for building and managing a self-configuring network 300 in accordance with an embodiment of the invention. From the foregoing description, those skilled in the art will recognize that many other variations of the present invention are possible. In particular, while the present invention has been described as being implemented in a network environment comprising one or more switches 100 connecting a LAN 102 and a network 104, some of the logic may be distributed in other components of a network or inter-network application. Thus, the present invention is not limited by the details described. Instead, the present invention can be practiced with modifications and alterations within the spirit and scope of the appended claims.

What is claimed is:

1. A computer-implemented method for building a self-configuring network, the method comprising:
   generating a command to provision connecting devices in a network with a network resource;
   associating the command with a management event in advance of the occurrence of the management event, the management event not detected in the connecting device, the management event occurring in a network management system for managing policy for the network and indicating that a network management policy represented in the command is to be deployed from the network management system to the network;
   generating a deployment target to which the command can be deployed from the network management system to the network, the deployment target comprising connecting devices in a pre-defined group based on at least one criteria, the at least one criteria including connecting devices that support Internet Protocol (IP) telephony services in the network, or connecting devices that support a Virtual Local Area Network, the connecting devices being selectable through a network management system;
   deploying the command from the network management system to a selected deployment target upon the occurrence in the network management system for managing policy for the network of the management event with which the command was previously associated;
   setting a network event in the selected deployment target to match the management event for which the command was deployed, and associating the deployed command with the network event, the network event being detectable in the connecting device in the selected deployment target; and
   automatically provisioning the connecting device with the network resource upon the occurrence of the network event with which the command is associated, the connecting device being in the pre-defined group to which the command has been deployed.

2. The method of claim 1, wherein the network event is related to an endpoint device connected to the network.

3. The method of claim 2, wherein the network event indicates when an endpoint device connects to or disconnects from the network.

4. The method of claim 2, wherein the endpoint device is a Voice over Internet Protocol (VoIP) telephone and the network resource is a device or service that supports IP telephony.

5. The method of claim 1, wherein the network event is related to a user connected to the network.

6. The method of claim 5, wherein the network event indicates whether a user is authenticated or not authenticated.

7. The method of claim 1, wherein the command to provision connecting devices with the network resource is a command to configure a port on the connecting devices in the pre-defined group to enable or disable access to the network resource.

8. The method of claim 7, further comprising selecting a port on the connecting devices in the pre-defined group, the selected port having a configuration that is changed in accordance with the command when the command is issued.

9. The method of claim 1, wherein the network resource comprises a device accessible on the network.

10. The method of claim 1, wherein the network resource comprises a service accessible on the network.

11. The method of claim 1, wherein the service is an IP telephony service.

12. The method of claim 1, wherein
   the network resource is a connecting device;
   the network event indicates when the connecting device is installed in the network; and
   the command to provision connecting devices with the network resource is a command to configure the connecting device after the connecting device is installed in the network.

13. An article of manufacture comprising:
   a computer readable non-transitory storage medium including instructions that, when executed on a machine, cause the machine to:
   generate a command to provision connecting devices in a network with a network resource;
   associate the command with a management event in advance of the occurrence of the management event, the management event not detected in the connecting devices, the management event occurring in a network management system for managing policy for the network and indicating that a network management policy as represented in the command is to be deployed from the network management system to the network;
   generate a deployment target to which the command can be deployed from the network management system to the network, the deployment target comprising a pre-defined group of the connecting devices based on certain criteria, the pre-defined group of the connecting devices being selectable through a network management system;
   deploy the command from the network management system to the deployment target upon the occurrence in the network management system for managing policy for the network of the management event;
   set a network event on each of the connecting devices in the deployment target to match the management event for which the command was deployed, and associate the deployed command with the network event, the network event being detectable in the connecting devices in the deployment target; and
   automatically provision the connecting device with the network resource upon the occurrence in the connecting device of the network event with which the command is associated, the connecting device being in the pre-defined group of the connected devices in the deployment target.

\* \* \* \* \*